(12) United States Patent
Yoon et al.

(10) Patent No.: US 12,420,724 B2
(45) Date of Patent: Sep. 23, 2025

(54) LUGGAGE TRIM AND LUGGAGE BOARD OF VEHICLE

(71) Applicants: Hyundai Motor Company, Seoul (KR); Kia Corporation, Seoul (KR)

(72) Inventors: Jinseok Yoon, Seoul (KR); Seung Kun Lee, Suwon-si (KR); Seok Cheol Kim, Suwon-si (KR); Min Soon Kim, Ansan-si (KR); Hee Soo Sim, Siheung-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 285 days.

(21) Appl. No.: 18/193,365

(22) Filed: Mar. 30, 2023

(65) Prior Publication Data

US 2024/0017682 A1 Jan. 18, 2024

(30) Foreign Application Priority Data

Jul. 18, 2022 (KR) .......................... 1020220088026

(51) Int. Cl.
*B60R 13/01* (2006.01)
*B60R 5/04* (2006.01)

(52) U.S. Cl.
CPC ............ *B60R 13/013* (2013.01); *B60R 5/044* (2013.01); *B60R 5/045* (2013.01)

(58) Field of Classification Search
CPC .............. B60R 13/013; B60R 13/0268; B60R 13/0275; B60R 13/02; B60R 5/044; B60R 5/04; B60R 5/045; B60R 5/048; B60R 5/02

USPC ............ 296/24.43, 24.44, 24.33, 37.5, 37.8, 296/37.16, 37.6; 108/44

See application file for complete search history.

(56) References Cited

U.S. PATENT DOCUMENTS

| 4,351,555 | A | * | 9/1982 | Hashimoto | ............. B60R 5/044 296/37.16 |
| 6,113,172 | A | * | 9/2000 | Chaloult | ................... B60R 5/04 296/37.16 |
| 6,176,535 | B1 | | 1/2001 | Chaloult et al. | |
| 6,688,820 | B2 | * | 2/2004 | Ootsuka | .................... B60P 3/40 410/77 |
| 6,733,060 | B1 | * | 5/2004 | Pavkov | ..................... B60R 5/04 224/543 |
| 9,227,569 | B2 | * | 1/2016 | Giorgis | .................. B60R 5/045 |

(Continued)

FOREIGN PATENT DOCUMENTS

| JP | 2002-079886 | 3/2002 |
| JP | 2003-025918 | 1/2003 |

(Continued)

*Primary Examiner* — Amy R Weisberg
*Assistant Examiner* — Denise Lynne Esquivel
(74) *Attorney, Agent, or Firm* — Fish & Richardson P.C.

(57) ABSTRACT

A luggage trim of a vehicle supports a luggage board that partitions a luggage room of the vehicle. The luggage trim includes an upper support member disposed at upper ends of opposite sides of the luggage room and configured to support the luggage board, and a lower support member that is disposed below the upper support member and protrudes from the opposite sides of the luggage room so that the luggage board is disposed. The luggage board is configured to be disposed on one of the upper support member or the lower support member to divide the space of the luggage room.

17 Claims, 12 Drawing Sheets

(56) References Cited

U.S. PATENT DOCUMENTS

| | | | |
|---|---|---|---|
| 9,914,399 B2* | 3/2018 | Lewis | B60R 5/04 |
| 10,793,074 B2* | 10/2020 | Schneider | B60R 5/04 |
| 2013/0009419 A1* | 1/2013 | Torres | B60R 5/044 |
| | | | 296/24.45 |
| 2014/0117695 A1* | 5/2014 | Murru | B60R 5/04 |
| | | | 296/24.44 |
| 2015/0343953 A1* | 12/2015 | Stanczak | B60N 2/206 |
| | | | 296/24.44 |
| 2022/0340091 A1* | 10/2022 | Ishii | B60R 13/013 |
| 2023/0278501 A1* | 9/2023 | Gill | B60R 5/04 |
| | | | 296/37.5 |

FOREIGN PATENT DOCUMENTS

| | | |
|---|---|---|
| JP | 3975733 | 6/2007 |
| JP | 2012-035767 | 2/2012 |
| KR | 1999-0026797 | 7/1999 |
| KR | 10-1484247 | 1/2015 |

\* cited by examiner

LUGGAGE TRIM AND LUGGAGE BOARD OF VEHICLE

CROSS-REFERENCE TO RELATED APPLICATION

This application is based on and claims priority under 35 U.S.C. § 119 to Korean Patent Application No. 10-2022-0088026, filed on Jul. 18, 2022, in the Korean Intellectual Property Office, the disclosure of which is incorporated by reference herein in its entirety.

TECHNICAL FIELD

The disclosure relates to a luggage trim and luggage board of a vehicle, and more particularly, to a luggage trim and a luggage board of a vehicle that can be installed in the luggage trim in various ways.

BACKGROUND

A luggage room for storing items is formed in a luggage trim of a vehicle, and the luggage trim is provided with a luggage board so that the luggage room may be divided in order to utilize the luggage room. The luggage board may be formed in a plate shape having a predetermined width, and may be installed in the middle of the luggage room in a vertical direction to divide the luggage room into upper and lower spaces.

In some cases, where a luggage board has a fixed installation position, it is difficult for a user to change the position of the luggage board. There is a method of arranging two existing boards, which are disposed at a lower end of the luggage trim, in a horizontal direction, and installing one of the two boards to divide the space of the luggage room.

In some cases, where one of the two boards disposed at the lower end is moved and used, the lower space may not be entirely supported. In addition, as a structure in which the board moved to the middle of the luggage room may be installed is fixedly installed, the space of the luggage room may be narrowed.

SUMMARY

It is an aspect of the disclosure to provide a luggage trim and luggage board of a vehicle capable of utilizing a luggage room formed in the luggage trim of the vehicle in various ways.

Additional aspects of the disclosure will be set forth in part in the description which follows and, in part, will be obvious from the description, or can be learned by practice of the disclosure.

In accordance with an aspect of the disclosure, a luggage trim includes an upper support member disposed at upper ends of opposite sides of a luggage room of a vehicle in which luggage is received, the upper support member being formed such that a luggage board to divide a space of the luggage room up and down is disposed thereon, a lower support member disposed below the upper support member to protrude from the opposite sides of the luggage room so that the luggage board is disposed, and the luggage board disposed on one of the upper support member and the lower support member to divide the space of the luggage room.

The luggage trim can further include a receiving groove formed inside the upper support member to receive the luggage board along an inclined surface formed on a rear surface of a chair of the vehicle.

The lower support member can include a mounting cover disposed to be inserted into a side surface of the luggage room and provided with an insertion groove having an open surface, and a mounting body provided to be rotated and inserted into the insertion groove of the mounting cover and to be rotated and protrude from the side surface of the luggage room.

The mounting body can include a rotation projection having a predetermined length and formed to protrude from opposite ends thereof in a longitudinal direction, and the mounting body can be rotated using the rotation projection as a rotation axis so as to be inserted into or protrude from the insertion groove of the mounting cover.

The mounting body can further include a locking projection formed to protrude from a surface from which the rotation projection protrudes, and a second locking groove can be formed on the mounting cover so that the locking projection is caught thereon when the mounting body is inserted into the insertion groove.

The lower support member can further include a support part formed to protrude from a side surface of the luggage room on one side of the mounting cover, the mounting body can further include a locking projection formed to protrude from a surface from which the rotation projection protrudes, and a first locking groove can be formed on the support part so that the locking projection is caught thereon when the mounting body is rotated and protrudes from the mounting cover.

The luggage board can include one or more protrusions formed to protrude to the outside of the luggage board at opposite ends of the luggage board, and one or more support grooves into which the protrusions are inserted can be formed on the upper support member so that the luggage board is installed.

The luggage board can include a main body formed to have a predetermined length and a predetermined width, a first wing coupled to one end of the main body in a longitudinal direction to be rotated with respect to the main body, and a second wing coupled to the other end of the main body in the longitudinal direction to be rotated with respect to the main body.

The luggage board can be disposed on the upper support member in a state in which the first wing and the second wing are rotated and folded.

The luggage board can be disposed on the lower support member in a state in which the first wing and the second wing are unfolded.

The main body can include a first panel formed to have a predetermined width, and a second panel disposed adjacent to the first panel and coupled to the first panel to be rotated with respect to the first panel.

In accordance with an aspect of the disclosure, a luggage board includes a main body having a predetermined length and a predetermined width and disposed in a luggage room to divide a space of the luggage room of a vehicle in which luggage is received, a first wing coupled to one end of the main body in a longitudinal direction to be rotated with respect to the main body, and a second wing coupled to the other end of the main body in the longitudinal direction to be rotated with respect to the main body.

The luggage board can further include one or more first hinges disposed on a lower surface of the main body so that the first wing is rotated with respect to the main body, and one or more second hinges disposed on the lower surface of the main body so that the second wing is rotated with respect to the main body.

A plurality of magnets to provide a magnetic force can be disposed on the main body, the first wing and the second wing, respectively, so that the first wing and the second wing are maintained in a folded state.

The main body can include one or more protrusions formed to protrude to the outside of the luggage board from opposite ends of the main body.

A lower surface of the one or more protrusions can be formed as an inclined surface.

The main body can include a first panel formed to have a predetermined width, and a second panel disposed adjacent to the first panel and coupled to the first panel to be rotated with respect to the first panel.

A direction in which the second panel is rotated with respect to the first panel can be different from a direction in which the first wing and the second wing are rotated with respect to the main body.

DETAILED DESCRIPTION

Hereinafter, one or more implementations of the disclosure will be described in detail with reference to the accompanying drawings. The implementations described below are provided by way of example so that those skilled in the art will be able to fully understand the spirit of the disclosure, and the disclosure is not limited to the implementations described below, and can be implemented in other forms. In order to clearly explain the disclosure, parts not related to the description are omitted from the drawings, and in the drawings, the width, length, thickness, etc. of the components can be exaggerated for convenience. Like reference numbers refer to like elements throughout this specification.

Hereinafter, a luggage trim 100 of a vehicle will be described with reference to FIGS. 1 to 12. In some implementations, the luggage trim 100 of the vehicle utilizes a luggage board 140 in order to be applied to a sport utility vehicle 200 and to utilize a luggage room 210 formed in the luggage trim 100 of the vehicle in various ways. In some implementations, the luggage trim 100 of the vehicle includes an upper support member 110, a lower support member 120, a receiving groove 130, and the luggage board 140.

The upper support member 110 can be disposed at an upper end of the luggage trim 100 of the vehicle, and the luggage board 140 can be disposed in a horizontal direction thereto. The luggage trim 100 can have a rim that is engaged with a luggage door 230 capable of opening and closing the luggage trim 100, the rim extends to the inside of the luggage trim 100, and the upper support member 110 can be disposed on an upper end of the rim. The upper support member 110 can be disposed on opposite upper sides of the rim of the upper end of the luggage trim 100, respectively.

Figure 11:
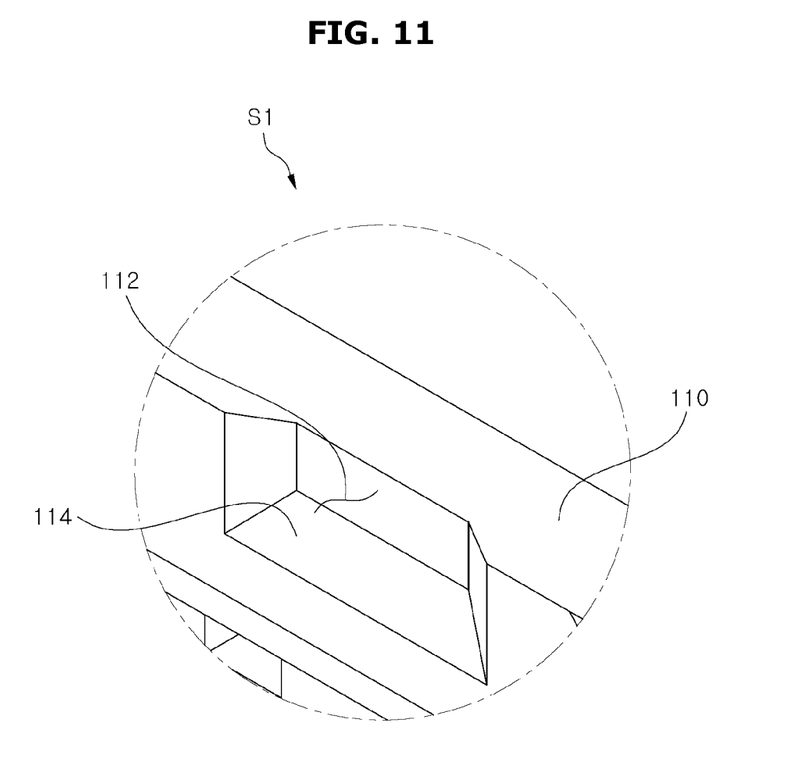
FIG. 11 is an enlarged view of a region S1 in FIG. 1.
Figure 12:
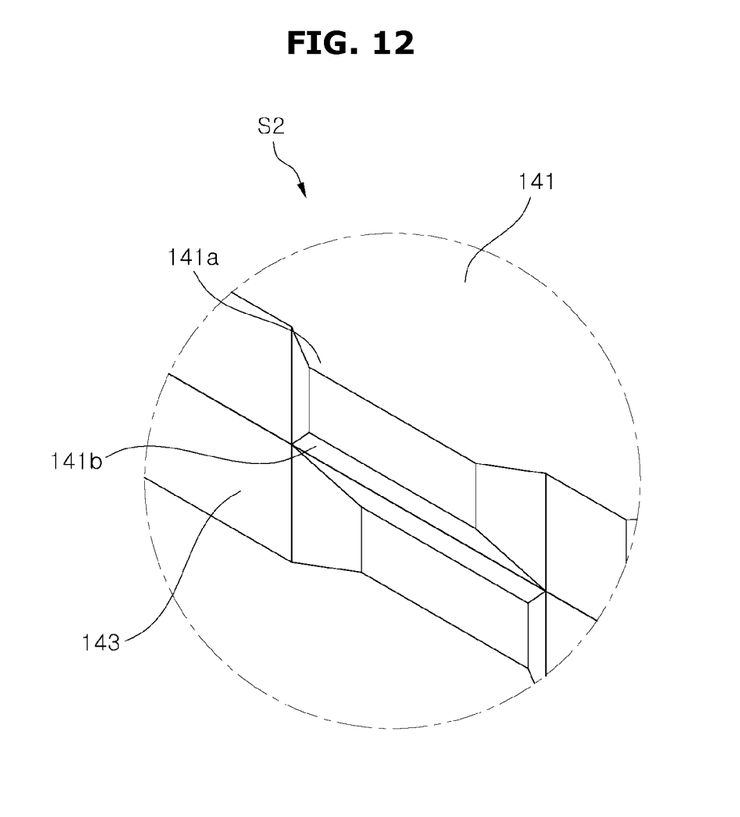
FIG. 12 is an enlarged view of a region S2 in FIG. 8.

As illustrated in FIG. 11, a support groove 112 can be formed on the upper support member 110 so that the luggage board 140 is disposed therein to fix a position of the luggage board 140. The support groove 112 can have a shape corresponding to a shape of a protrusion 141a of the luggage board 140, which will be described later. Details of the shape of the support groove 112 will be described later.

The lower support member 120 can be disposed on an inner surface of the luggage trim 100, that is, disposed at positions opposite to opposite sides of the inner surface of the luggage trim 100. The lower support member 120 can be disposed on the inner surface of the luggage trim 100 in a rotatable structure. Accordingly, the lower support member 120 can be disposed flush with the inner surface when not in use. The lower support member 120 includes a mounting body 122, a mounting cover, 124 and a support part 126.

Figure 1:
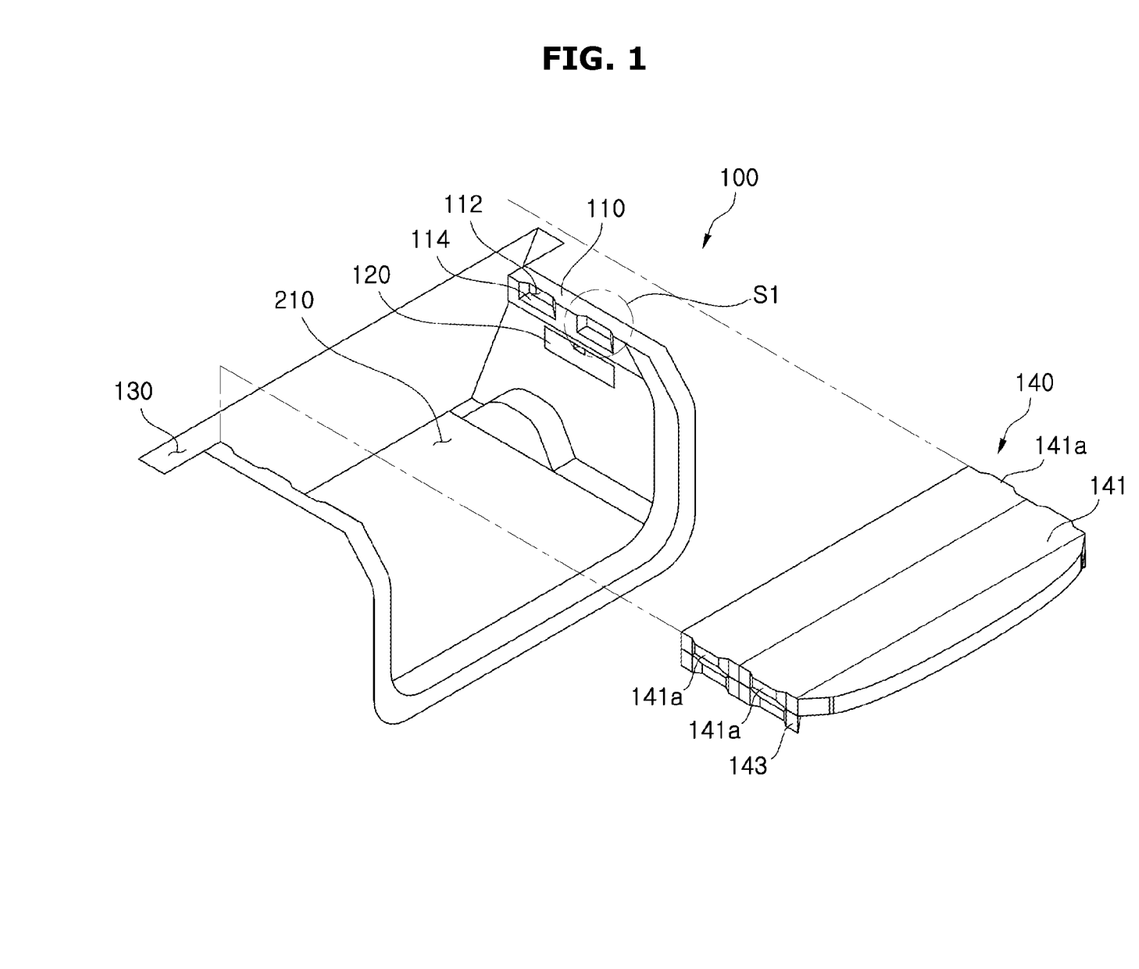
FIG. 1 is a view showing an example of a luggage trim of a vehicle and a luggage board installed in the luggage trim.
Figure 2:
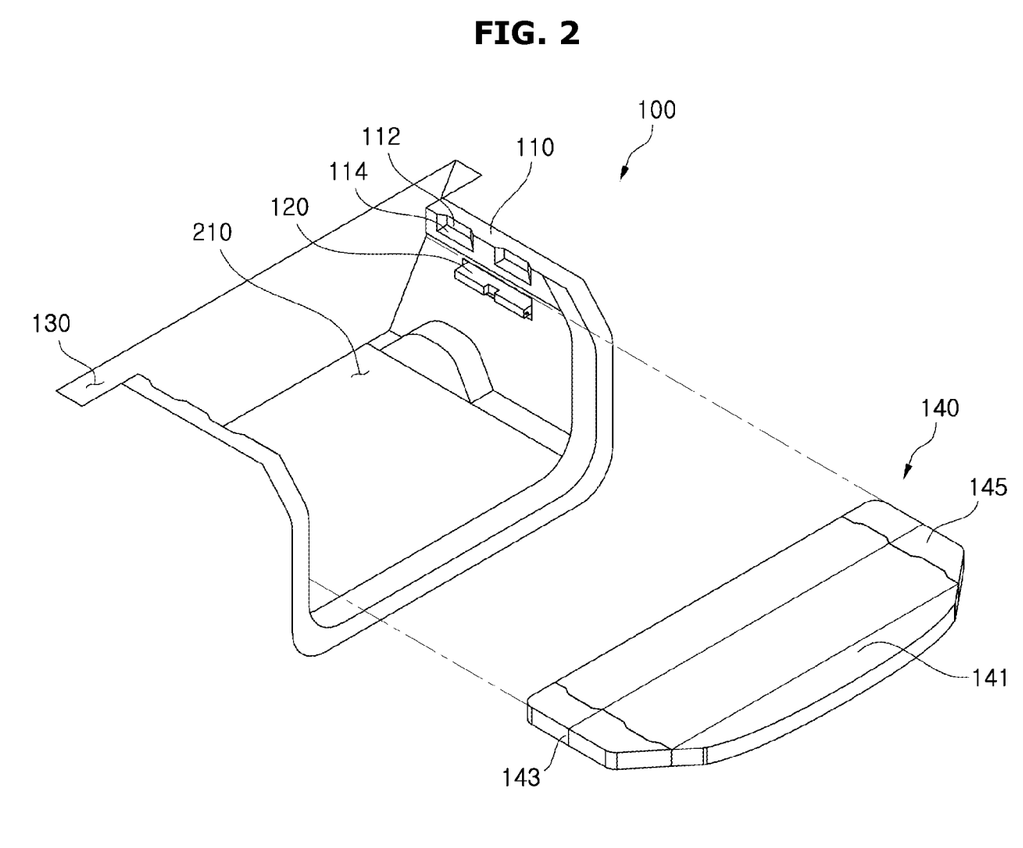
FIG. 2 is a view showing the luggage board installed downwardly in the luggage trim of the vehicle.
Figure 3:
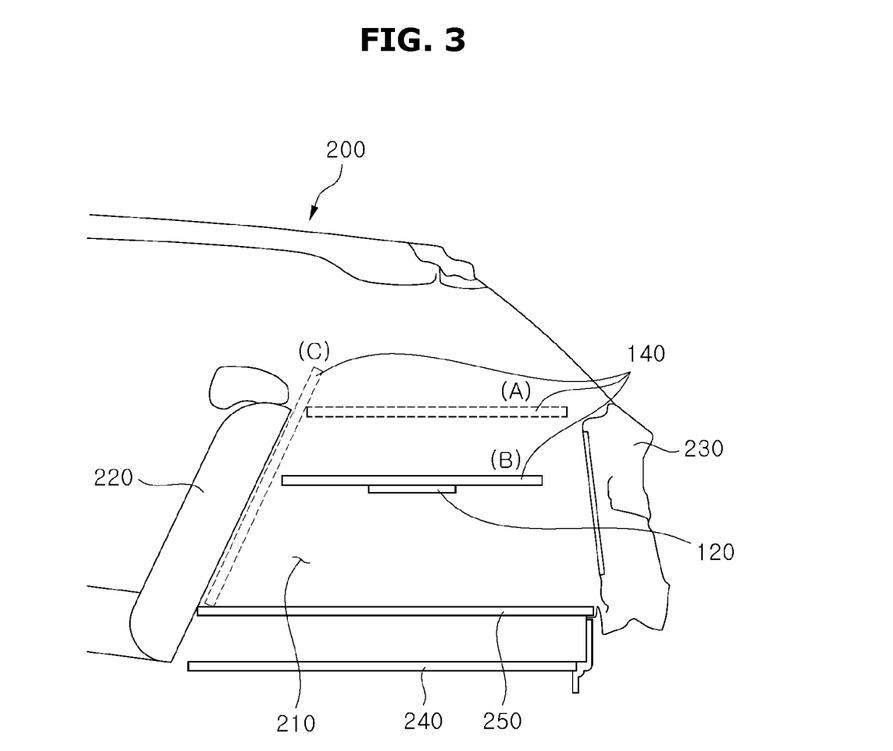
FIG. 3 is a view showing the luggage board that can be disposed in various states in the luggage trim of the vehicle.

The mounting body 122 can be rotated in a state of being inserted into the mounting cover 124, can be disposed so as not to protrude from the inner surface of the luggage trim 100 in a normal state, as illustrated in FIG. 1, and can be rotated to protrude from the inner surface of the luggage trim 100 when in use, as illustrated in FIGS. 2 and 3. The mounting body 122 can have a substantially rectangular shape, and rotation projections 122a can be disposed on opposite sides of the mounting body 122.

The rotation projection 122a can be disposed to protrude in a substantially cylindrical shape from the opposite sides of the mounting body 122. The rotation projection 122a can be rotated by being caught on the mounting cover 124.

Figure 4:
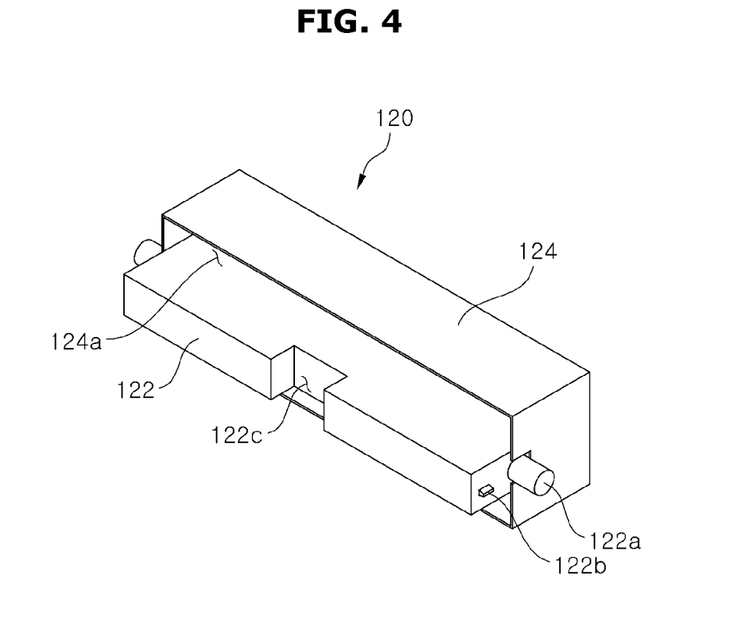
FIG. 4 is a view illustrating an example of a lower support member of the luggage trim of the vehicle.
Figure 5:
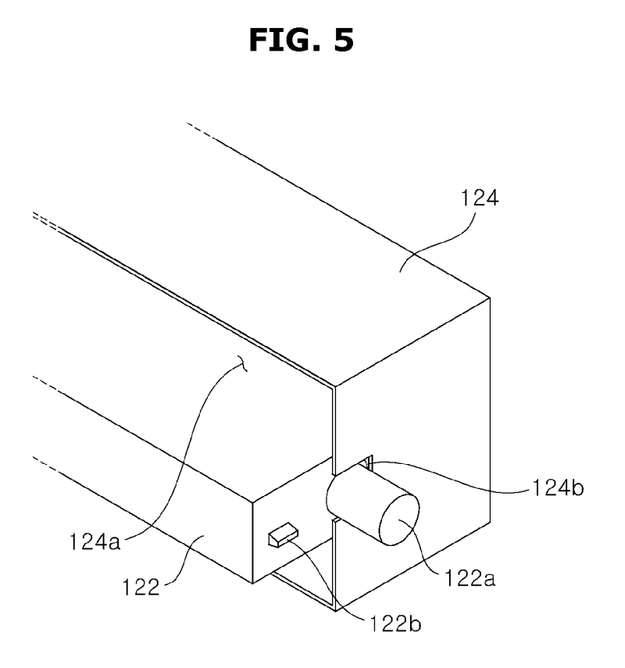
FIG. 5 is a view showing the lower support member of the luggage trim of the vehicle.
Figure 6:
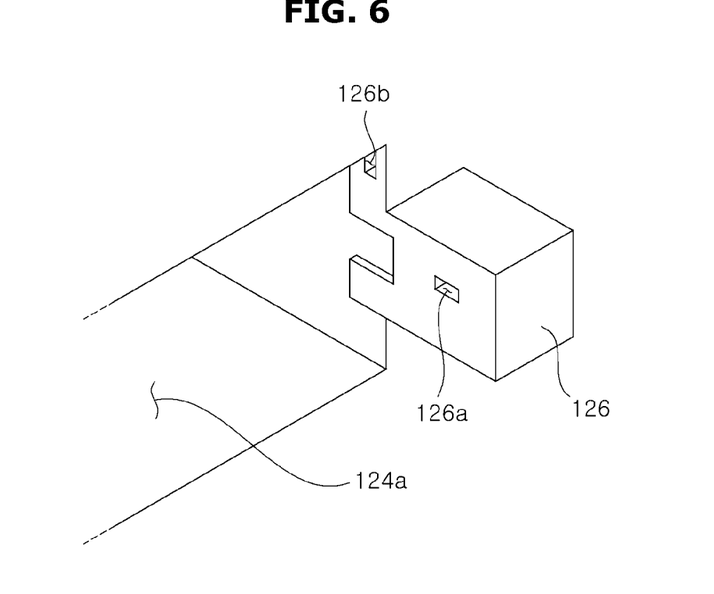
FIG. 6 is a view showing an example configuration for supporting the lower support member of the luggage trim of the vehicle.
Figure 7:
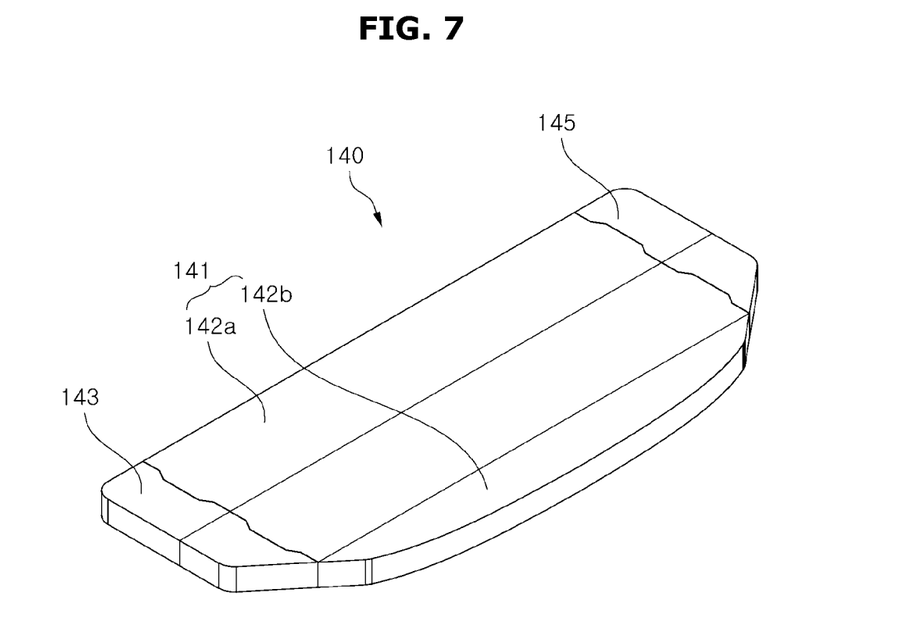
FIG. 7 is a view showing the luggage board of the vehicle.
Figure 8:
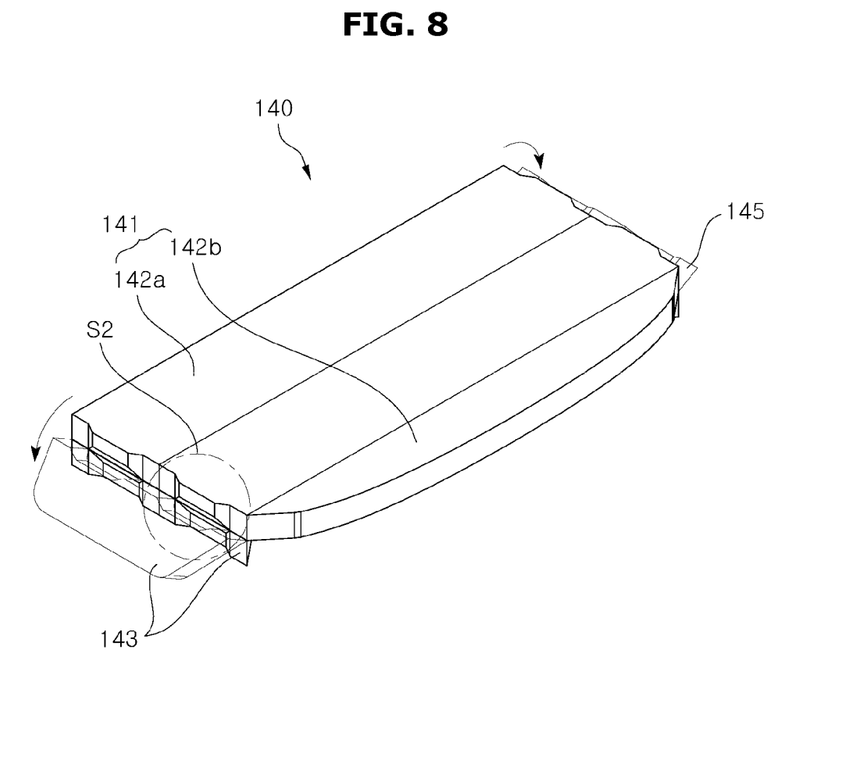
FIG. 8 is a view showing a state in which the luggage board of the vehicle is folded.

As illustrated in FIGS. 3 and 4, a locking projection 122b can be provided on at least one of the opposite sides of the mounting body 122. The locking projection 122b can be caught on the mounting cover 124 and the support part 126 to prevent the mounting body 122 from being easily rotated. The locking projection 122b has a shape protruding from the mounting body 122, and can be inserted into the mounting body 122 to provide a restoring force in a direction of protruding by an elastic body. That is, the locking projection 122b can be disposed on the mounting body 122 to have elastic restoring force.

As illustrated in FIG. 4, a handle groove 122c can be formed on the mounting body 122. The handle groove 122c can be formed in a shape in which a portion of the mounting body 122 is recessed, and can have a size through which at least one finger of a user can pass. For example, the single handle groove 122c can be formed on a side surface of the mounting body 122 in a longitudinal direction.

The mounting cover 124 can have a substantially rectangular parallelepiped shape, an insertion groove 124a can be formed therein, and one surface can have an open shape. The mounting body 122 can be inserted into the insertion groove 124a of the mounting cover 124, and the mounting body 122 can be rotated within the insertion groove 124a.

A support groove 124b can be formed at opposite ends of the mounting cover 124 in a longitudinal direction. The rotation projection 122a of the mounting body 122 can be caught on and disposed in the support groove 124b. The mounting body 122 can be rotated using the rotation projection 122a as a rotation axis in a state in which the rotation projection 122a of the mounting body 122 is caught on the support groove 124b.

Therefore, the mounting body 122 can be rotated with the rotation projection 122a as a rotation axis in a state of being inserted into the insertion groove 124a of the mounting cover 124, can be disposed in the state of being inserted into the mounting cover 124 when disposed in a vertical direction, and can be disposed in a state of protruding from the mounting cover 124 when disposed in a horizontal direction.

As such, as the mounting body 122 is rotated in and protrudes from the mounting cover 124, the luggage board 140 can be seated on an upper surface of the mounting body 122.

The support part 126 can be disposed on the inner surface of the luggage trim 100 on which the mounting cover 124 is disposed, can be disposed at a position adjacent to the mounting cover 124, and can be disposed on at least one of opposite sides of the mounting cover 124 in a longitudinal direction. The support part 126 can be disposed to protrude inward from the inner surface of the luggage trim 100.

The support part 126 can support the luggage board 140 together with the mounting body 122 when the mounting body 122 is rotated in and protrudes from the mounting cover 124. A first locking groove 126a can be formed on the support part 126. The first locking groove 126a can be formed in a shape having a predetermined width and depth on the support part 126, and the locking projection 122b disposed on the mounting body 122 can be inserted into the first locking groove 126a when the mounting body 122 is rotated in and protrudes from the mounting cover 124.

As such, as the locking projection 122b disposed on the mounting body 122 is inserted into the first locking groove 126a formed on the support part 126, the mounting body 122 can be maintained in the state of protruding from the mounting cover 124. That is, the first locking groove 126a can prevent the mounting body 122 from being rotated again to be inserted into the insertion groove 124a of the mounting cover 124.

A second locking groove 126b can be formed on the mounting cover 124. When the mounting body 122 is rotated and inserted into the insertion groove 124a of the mounting cover 124, the locking projection 122b disposed on the mounting body 122 is inserted into the second locking groove 126b to prevent the mounting body 122 from being easily rotated again to protrude from the mounting cover 124.

The receiving groove 130 is formed in the luggage trim 100 and can be formed at an inner end of the luggage trim 100 so that the luggage board 140 can be inserted therein. The chair 220 of the vehicle 200 can be positioned inside the luggage trim 100, and a rear surface of the chair 220 can be exposed to the luggage trim 100. The receiving groove 130 can have a predetermined length and depth so that the luggage board 140 can be inserted therein along a rear slope of the chair 220.

A mode in which the luggage board 140 is disposed on the luggage trim 100 will be described with reference to FIG. 3. For example, mode A, mode B, and mode C are defined depending on a position where the luggage board 140 is disposed. First, in mode A, the luggage board 140 is disposed on the upper support member 110. As the luggage board 140 is disposed on the upper support member 110, various bits of luggage can be stored in the luggage trim 100 below the luggage board 140, and a little of luggage can be received in the luggage trim 100 above the luggage board 140. In this case, the space of the luggage trim 100 can be divided such that a few pieces of luggage having a large height can be disposed below the luggage board 140.

As illustrated in FIG. 1, the luggage board 140 can include a first wing 143 and a second wing 145 disposed on opposite sides of the luggage board 140 in a folded state. Details of the first wing 143 and the second wing 145 of the luggage board 140 will be described later.

In mode B, the luggage board 140 is disposed on the lower support member 120. In this case, as illustrated in FIG. 2, the luggage board 140 can be disposed in a state in which the first wing 143 and the second wing 145 disposed on the opposite sides of the luggage board 140 are unfolded. As the luggage board 140 is disposed on the lower support member 120, the space of the luggage trim 100 can be divided into upper and lower spaces with respect to the luggage board 140. As the luggage board 140 is disposed lower than in mode A, the upper space above the luggage board 140 among the spaces of the luggage trim 100 is widened, so that the upper and lower spaces can be divided relatively equally with respect to the luggage board 140.

In mode C, the luggage board 140 is inserted into the receiving groove 130. Accordingly, the luggage trim 100 can be formed as a single space. The luggage board 140 can be in close contact with the rear surface of the chair 220 of the vehicle 200, and thus the space of the luggage trim 100 may not be restricted by the luggage board 140. In addition, when the entire space of the luggage trim 100 is used as the luggage board 140 is inserted into the receiving groove 130, there is no need for the luggage board 140 to be disposed at a different position.

A first board 240 and a second board 250 can be disposed in the luggage room 210 of the luggage trim 100 of the vehicle 200, and an auxiliary tire or a kit for repairing a tire of the vehicle 200 can be received in a space between the first board 240 and the second board 250. In addition, the luggage door 230 can be disposed to open and close the luggage trim 100.

Hereinafter, the luggage board 140 of the disclosure will be described with reference to FIGS. 7 to 12. As described above, the luggage board 140 can be installed or received in the luggage trim 100 of the vehicle 200, and can divide the space of the luggage trim 100. In some examples, the luggage board 140 includes a main body 141, the first wing 143, and the second wing 145.

The main body 141 can be formed in a plate shape having a predetermined width, can have a substantially rectangular shape and can be provided with a handle that the user can hold on one side thereof.

The main body 141 can include a first panel 142a and a second panel 142b. The first panel 142a can have a substantially rectangular shape. The second panel 142b is disposed adjacent to the first panel 142a and is disposed to be foldable with respect to the first panel 142a.

Figure 10:
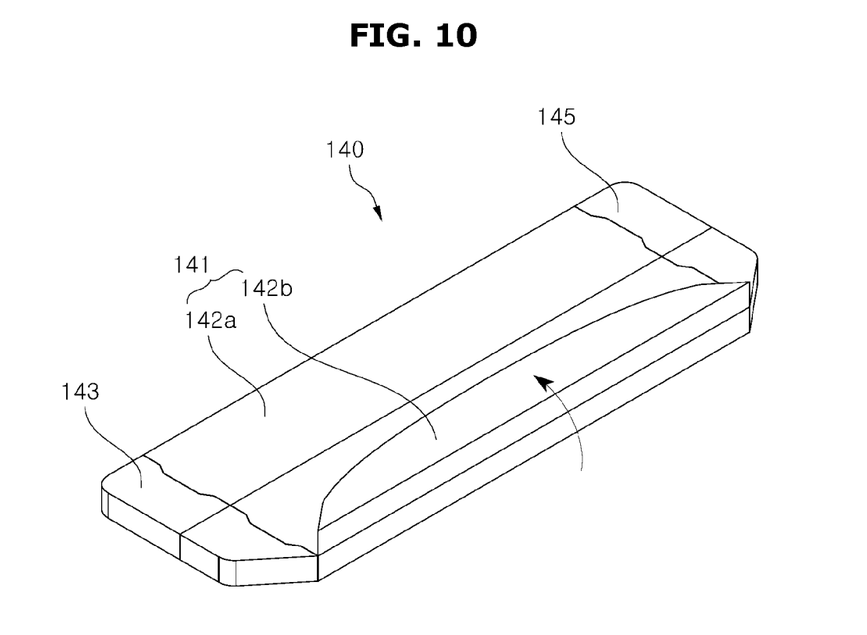
FIG. 10 is a view showing a state in which the luggage board of the vehicle is folded to an upper surface.

The second panel 142b can have a smaller size than the first panel 142a and can be disposed adjacent to a long side of the first panel 142a having a rectangular shape. The first panel 142a and the second panel 142b have different structures capable of being separated from each other, but upper surfaces thereof are connected with cloth or a predetermined material. Accordingly, as illustrated in FIG. 10, the second panel 142b can be folded such that the upper surfaces of the first panel 142a and the second panel 142b meet each other. Herein, the handle can be formed on the second panel 142b.

As the second panel 142b is folded with respect to the first panel 142a, the first panel 142a can have a structure of being divided into two panels and being folded and unfolded.

Figure 9:
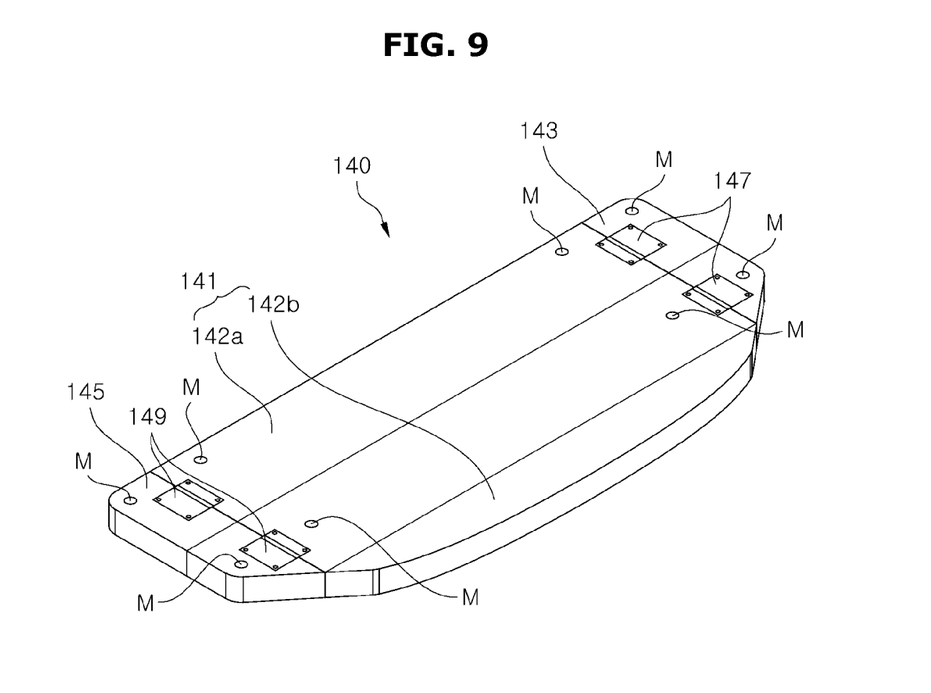
FIG. 9 is a view illustrating a lower surface of the luggage board of the vehicle.

The first wing 143 and the second wing 145 can be disposed on opposite side ends of the main body 141, respectively, and can be coupled to the main body 141 to be rotated and folded with respect to the main body 141. As illustrated in FIG. 9, the first wing 143 and the second wing 145 can be coupled to the main body 141 by a first hinge 147 and a second hinge 149 disposed on lower surfaces thereof, respectively. The first wing 143 and the second wing 145 as described above can be disposed at opposite side ends of the first panel 142a, respectively.

That is, the first wing 143 can be coupled to the main body 141 by the at least one first hinge 147, and the second wing 145 can be coupled to the main body 141 by the at least one second hinge 149. Therefore, the first wing 143 and the second wing 145 are rotated and folded by the first hinge 147 and the second hinge 149, respectively, so that the lower surface of the first wing 143 and a lower surface of the main body 141 can come into contact with each other, and the lower surface of the second wing 145 and the lower surface of the main body 141 can come into contact with each other.

One or more magnets M can be disposed on the main body 141, the first wing 143, and the second wing 145, respectively. The magnets M can provide a magnetic force such that the first wing 143 and the second wing 145 rotated and folded with respect to the main body 141 are maintained in the folded state. In this case, a polarity of the magnets M disposed on the main body 141 and a polarity of the magnets M disposed on the first wing 143 and the second wing 145 can be different from each other. Therefore, in a state in which the first wing 143 and the second wing 145 are rotated and folded with respect to the main body 141, the folded state thereof can be maintained by the magnetic force of the magnets M.

In this case, a direction in which the first wing 143 and the second wing 145 are rotated with respect to the main body 141 and a direction in which the second panel 142b is rotated with respect to the first panel 142a can be different from each other.

As described above, when the first wing 143 and the second wing 145 are folded, the one or more protrusions 141a can be formed at opposite ends of the main body 141, respectively. The drawings, for example, illustrate that two of the protrusions 141a are formed at the opposite ends of the main body 141, respectively. The protrusions 141a are formed to protrude outward from the opposite ends of the main body 141. The protrusion 141a has a shape of protruding a portion of an upper surface of the main body 141 in an outward direction from opposite sides thereof. For examples, the protrusion 141a can protrude in a substantially trapezoidal shape. A groove can be formed on each of the first and second wings 143 and 145 to correspond to the shape of the protrusions 141a formed on the main body 141.

The protrusion 141a formed as described above can be inserted into the support groove 112 formed on the upper support member 110 so that the position of the luggage board 140 does not change when the luggage board 140 is disposed on the upper support member 110. Therefore, the shape of the support groove 112 formed on the upper support member 110 can correspond to the shape of the protrusion 141a. In some examples, a protruding inclined surface 141b can be formed on a lower surface of the protrusion 141a, and a groove inclined surface 114 can be formed in the support groove 112 to correspond thereto.

The protrusion inclined surface 141b formed on the lower surface of the protrusion 141a can be inclined toward a center of the main body 141 from an outer surface of the protrusion 141a. As the protruding inclined surface 141b is formed in this way, when the luggage board 140 is disposed on the upper support member 110, the protrusion 141a can be more easily inserted into the support groove 112 of the upper support member 110, and accordingly, the luggage board 140 can be more easily installed in the upper support groove 112.

As is apparent from the above, a luggage board can be disposed in various positions, so that a space of a luggage trim of a vehicle can be divided and used depending on the convenience of a user.

In addition, the luggage board can be inserted and received in a position where a chair of the vehicle is disposed, so that the space of the luggage trim can be utilized to the maximum.

What is claimed is:

1. A luggage trim of a vehicle, the vehicle having a luggage room, the luggage trim being configured to support a luggage board that partitions the luggage room, the luggage trim comprising:
    an upper support member disposed at upper ends of opposing sides of the luggage room, the upper support member being configured to support the luggage board; and
    a lower support member that is disposed below the upper support member and protrudes from the opposing sides of the luggage room, the lower support member being configured to support the luggage board,
    wherein the luggage board is configured to be disposed on either the upper support member or the lower support member,
    wherein the lower support member comprises:
        a mounting cover disposed at at least one of the opposing sides of the luggage room, the mounting cover defining an insertion groove, and
        a mounting body inserted into the insertion groove of the mounting cover and configured to rotate relative to the mounting cover, the mounting body protruding from the at least one of the opposing sides of the luggage room.

2. The luggage trim according to claim 1, wherein the upper support member defines a receiving groove configured to receive the luggage board along an inclined rear surface of a chair of the vehicle.

3. The luggage trim according to claim 1, wherein the mounting body comprises a rotation projection that has a predetermined length and protrudes from ends of the mounting body in a longitudinal direction of the mounting body, and
    wherein the mounting body is configured to rotate relative to the mounting cover about a rotation axis extending through the rotation projection, the mounting body being configured to, based on rotating relative to the mounting cover, be inserted into and protrude outward from the insertion groove of the mounting cover.

4. The luggage trim according to claim 3, wherein the mounting body further comprises a locking projection that protrudes from a side surface of the mounting body, the rotation projection protruding from the side surface of the mounting body; and
    wherein the mounting cover defines a locking groove configured to receive the locking projection based on the mounting body being inserted into the insertion groove.

5. The luggage trim according to claim 3, wherein the lower support member further comprises a support part that protrudes from one of the opposing sides of the luggage room and disposed at a side of the mounting cover, wherein the mounting body further comprises a locking projection that protrudes from a side surface of the mounting body, the rotation projection protruding from the side surface of the mounting body, and wherein the support part defines a first locking groove configured to receive the locking projection based on the mounting body being rotated relative to the mounting cover and protruding from the mounting cover.

6. The luggage trim according to claim 1, wherein the luggage board comprises one or more protrusions that protrude laterally outward from ends of the luggage board, and wherein the upper support member defines one or more support grooves configured to receive and support the one or more protrusions of the luggage board.

7. The luggage trim according to claim 1, wherein the luggage board comprises:
  a main body having a predetermined length and a predetermined width;
  a first wing coupled to a first end of the main body and configured to rotate with respect to the main body; and
  a second wing coupled to a second end of the main body and configured to rotate with respect to the main body, the second end being spaced apart from the first end in a longitudinal direction of the main body.

8. The luggage trim according to claim 7, wherein the lower support member is configured to seat the luggage board thereon in a state in which the first wing and the second wing are unfolded by rotating with respect to the main body.

9. The luggage trim according to claim 7, wherein the main body comprises:
  a first panel; and
  a second panel coupled to the first panel and configured to rotate with respect to the first panel.

10. A luggage trim of a vehicle, the vehicle having a luggage room, the luggage trim being configured to support a luggage board that partitions the luggage room, the luggage trim comprising:
  an upper support member disposed at upper ends of opposing sides of the luggage room, the upper support member being configured to support the luggage board; and
  a lower support member that is disposed below the upper support member and protrudes from the opposing sides of the luggage room, the lower support member being configured to support the luggage board,
  wherein the luggage board is configured to be disposed on either the upper support member or the lower support member,
  wherein the luggage board comprises:
    a main body having a predetermined length and a predetermined width,
    a first wing coupled to a first end of the main body and configured to rotate with respect to the main body, and
    a second wing coupled to a second end of the main body and configured to rotate with respect to the main body, the second end being spaced apart from the first end in a longitudinal direction of the main body, and
  wherein the upper support member is configured to seat the luggage board thereon in a state in which the first wing and the second wing are folded by rotating with respect to the main body.

11. A luggage board configured to partition a luggage room of a vehicle, the luggage board comprising:
  a main body configured to be disposed in the luggage room and partition the luggage room, the main body having a predetermined length and a predetermined width;
  a first wing coupled to a first end of the main body and configured to rotate with respect to the main body; and
  a second wing coupled to a second end of the main body and configured to rotate with respect to the main body, the second end being spaced apart from the first end in a longitudinal direction of the main body,
  wherein the main body comprises one or more protrusions that protrude laterally outward from opposite ends of the main body, and
  wherein the first wing and the second wing define one or more grooves configured to receive the one or more protrusions based on rotation of the first wing and the second wing with respect to the main body.

12. The luggage board according to claim 11, further comprising:
  one or more first hinges disposed at a lower surface of the main body and configured to enable the first wing to rotate with respect to the main body; and
  one or more second hinges disposed at the lower surface of the main body and configured to enable the second wing to rotate with respect to the main body.

13. The luggage board according to claim 11, further comprising:
  a plurality of magnets disposed at the main body and configured to maintain the first wing and the second wing in a folded state.

14. The luggage board according to claim 11, wherein a lower surface of the one or more protrusions is inclined with respect to a bottom surface of the main body.

15. The luggage board according to claim 11, wherein the main body comprises:
  a first panel; and
  a second panel coupled to the first panel and configured to rotate with respect to the first panel.

16. The luggage board according to claim 15, wherein the second panel is configured to rotate in a first direction with respect to the first panel, and
  wherein the first wing and the second wing are configured to rotate in a second direction with respect to the main body, the second direction being different from the first direction.

17. The luggage board according to claim 16, wherein the second direction is orthogonal to the first direction.

* * * * *